April 12, 1966 S. N. SMALL 3,245,297
PLASTIC TUBE CUTTER AND DISPENSER
Filed Jan. 25, 1965 3 Sheets-Sheet 1
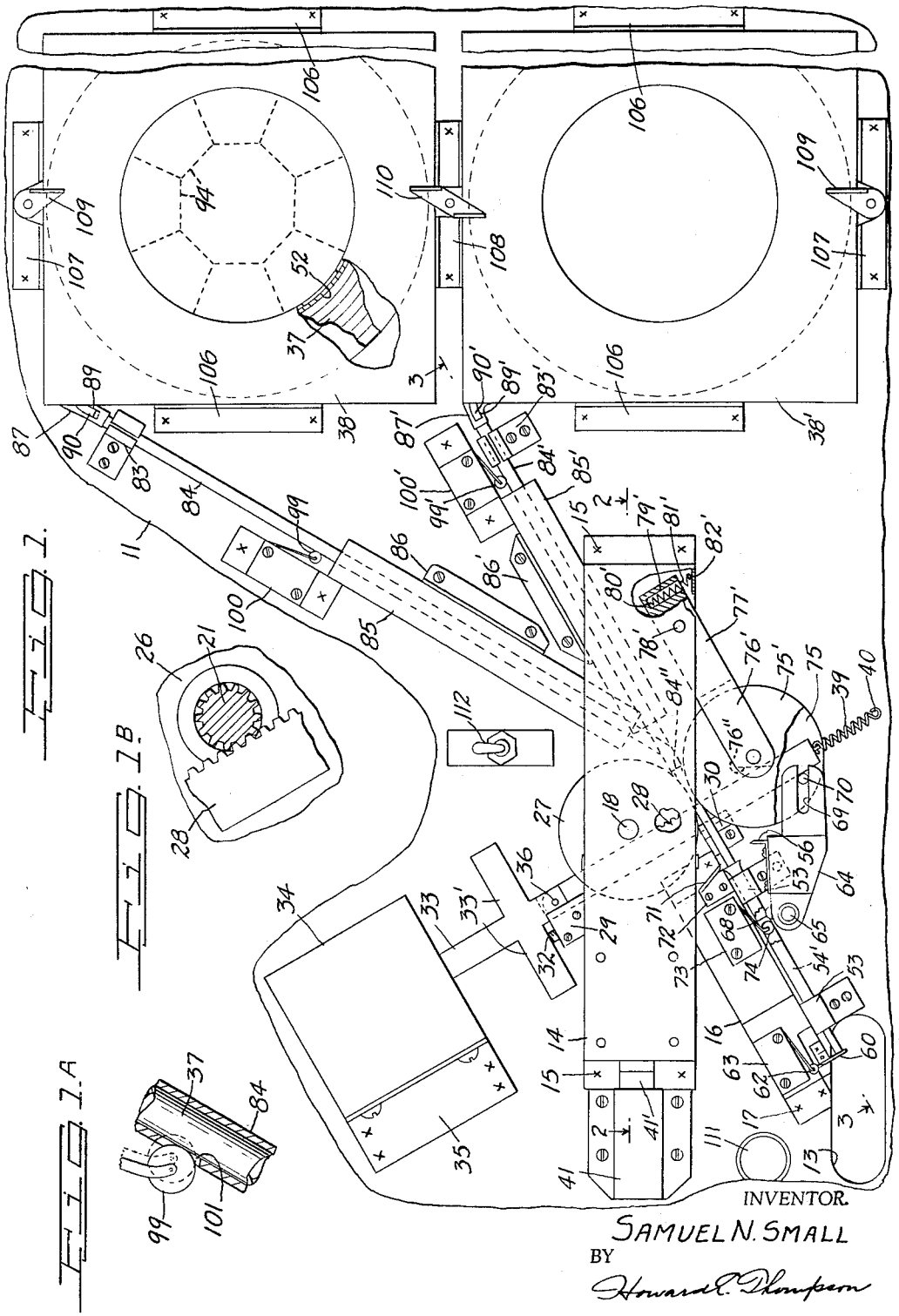
INVENTOR.
SAMUEL N. SMALL
BY
Howard C. Thompson
ATTORNEY April 12, 1966 S. N. SMALL 3,245,297
PLASTIC TUBE CUTTER AND DISPENSER
Filed Jan. 25, 1965 3 Sheets-Sheet 2
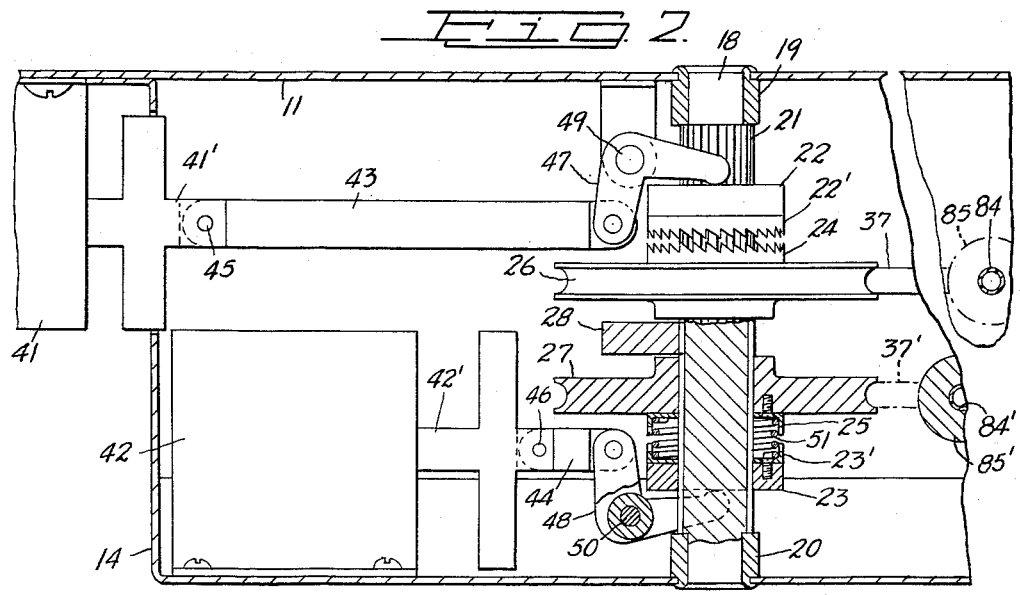
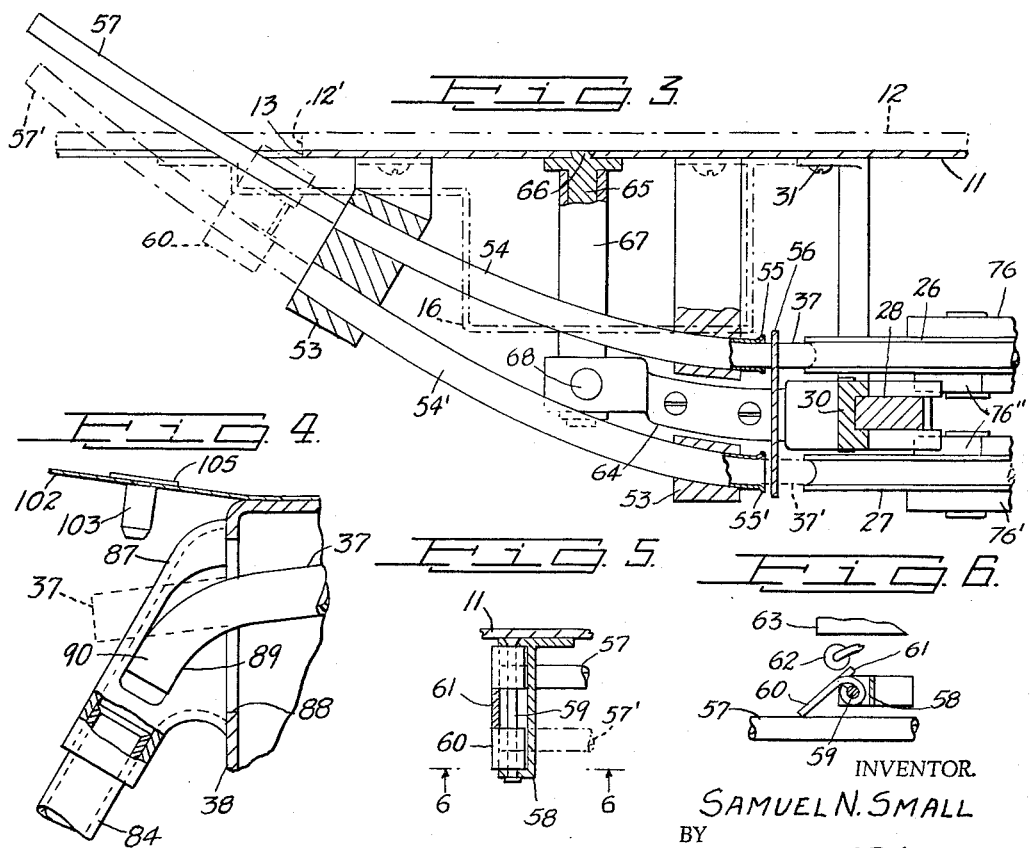
INVENTOR.
SAMUEL N. SMALL
BY
Howard C. Thompson
ATTORNEY

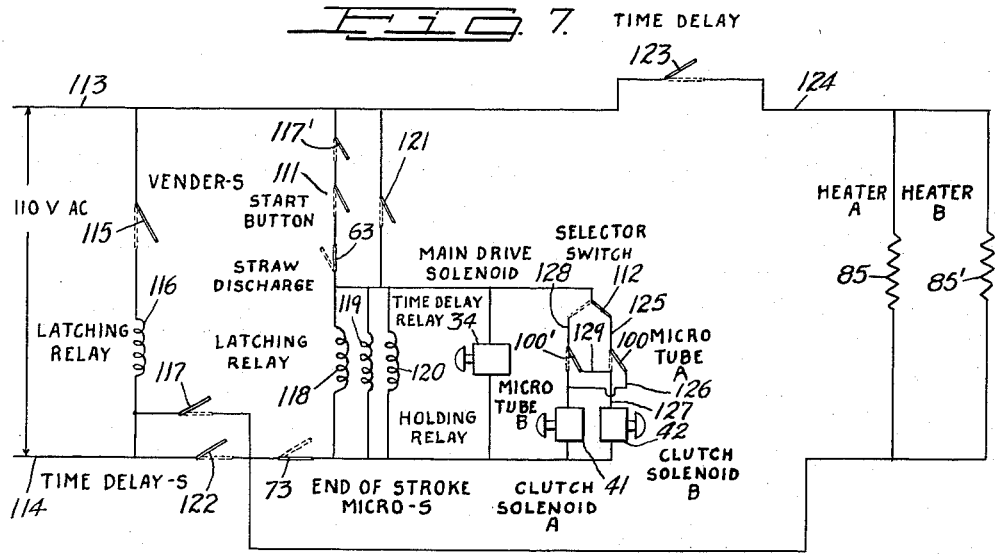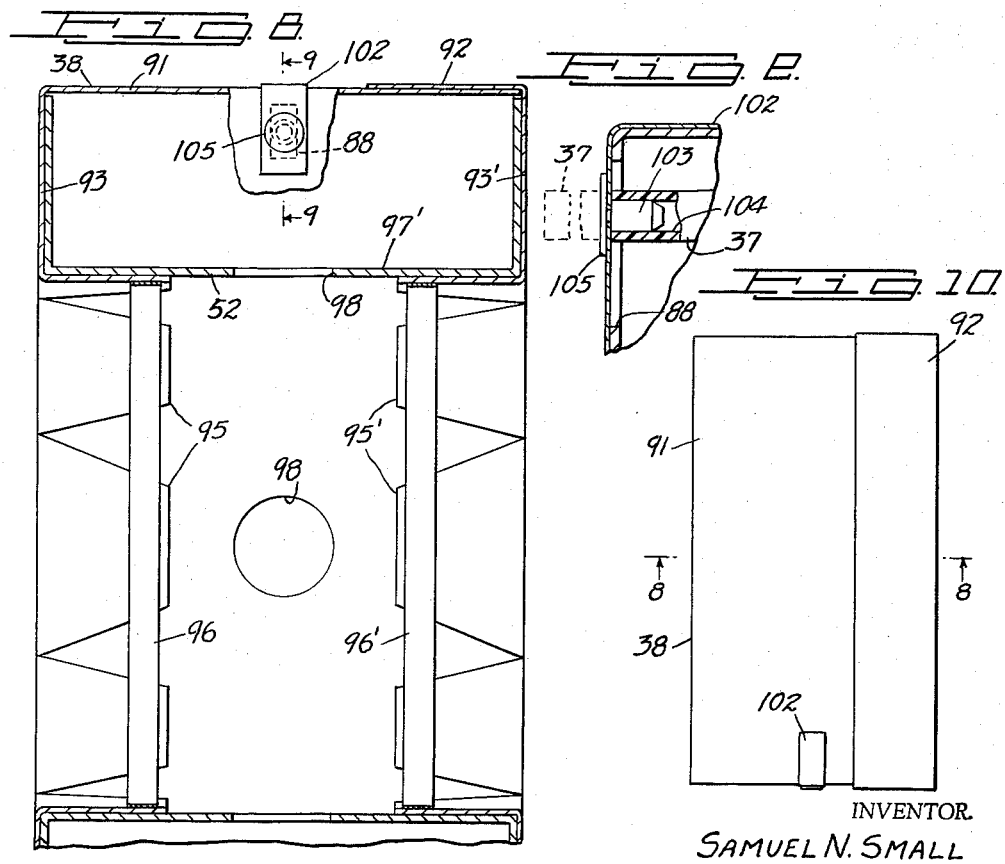
INVENTOR.
SAMUEL N. SMALL

United States Patent Office 3,245,297
Patented Apr. 12, 1966

3,245,297
PLASTIC TUBE CUTTER AND DISPENSER
Samuel N. Small, Valley Stream, N.Y., assignor to
Julius Duberstein, New York, N.Y.
Filed Jan. 25, 1965, Ser. No. 427,889
20 Claims. (Cl. 83—170)

This invention relates to an apparatus or vending machine attachment for dispensing plastic tubular drinking straws, wherein the plastic tubular material from which the straws are formed is stored on a spool or spools and fed therefrom to a cutting and straw delivery and supporting station, from which the cut straw can be manually removed. The invention deals with an apparatus generally of the type and kind disclosed in United States Patent Number 3,165,957 issued January 19, 1965.

More particularly, the invention deals with an apparatus of the character defined, wherein tubular material for supply to the apparatus is stored in a pair of generally similar sealed containers having means for projecting an end of the tubular material from the container for positioning in guide tubes directed to a cutting and delivery station, whereby a substantially constant supply of the tubular material can be maintained.

Still more particularly, the invention deals with an apparatus of the character defined, wherein means is employed for heating the tubular material prior to its passage into the cutting and delivery station of the apparatus.

Further, the invention deals with an electric circuit actuated by a manually operated push button for dispensing a straw as and when required by the purchaser of liquid refreshment at a vending machine. Here, it is to be kept in mind that, at times, these liquid refreshments are consumed directly from the container without the use of a straw.

The novel features of the invention will be best understood from the following description, when taken together with the accompanying drawings, in which certain embodiments of the invention are disclosed and, in which, the separate parts are designated by suitable reference characters in each of the views and, in which:

FIG. 1 is a diagrammatic face view illustrating general positioning of the parts of one of my apparatus or units as it might appear on the inner surface of a door of a vending machine, parts of the construction being broken away and parts in section.

FIG. 1A is an enlarged sectional detail view illustrating one of the micro switch controls which I employ.

FIG. 1B is an enlarged sectional detail view through the driven shaft, illustrating its engagement with the rack bar actuated by one of the solenoids of the apparatus shown, for example, in FIG. 1 of the drawing.

FIG. 2 is an enlarged partial diagrammatic sectional view, generally on the line 2—2 of FIG. 1, with parts of the construction shown in elevation and omitting background showing.

FIG. 3 is an enlarged partial section on the line 3—3 of FIG. 1, illustrating one cut straw in projected position and an associated straw in projected position in dot-dash lines, parts of the structure being indicated in dot-dash lines and parts of the construction being broken away.

FIG. 4 is an enlarged side and sectional view of the corner portion of one of the tubular coil containers illustrating positioning of the tube end of one of the guide tubes of the apparatus with the normal seal and tube end feed means shown in open position.

FIG. 5 is an enlarged plan sectional detail view of part of the structure shown in FIG. 1.

FIG. 6 is a section generally on the line 6—6 of FIG. 5, omitting background showing and illustrating parts of the construction in a different position.

FIG. 7 is a diagrammatic view of the circuit controlling operation of the apparatus.

FIG. 8 is an enlarged sectional view through one of the tube spool supporting containers, as illustrated in FIG. 1, but omitting the tubing on the spool, with part of the structure shown in elevation, the section being generally on the line 8—8 of FIG. 10.

FIG. 9 is an enlarged sectional detail view, taken on the line 9—9 of FIG. 8, and generally similar to the showing in FIG. 4, but illustrating the parts in the sealed position in full lines and showing a tube end; and FIG. 10 is a side view of a container, as shown in FIG. 8, and similar to the containers illustrated in FIG. 1.

My improved apparatus is preferably formed as a prefabricated unit which, in its assemblage, can be mounted in connection with any type and kind of vending machine, or which can constitute, in itself, a complete vending unit for vending straws as and where required, particularly in the sale of liquid refreshments of any type or kind. By way of illustrating one adaptation and use of my invention, the unit assemblage comprises a mounting plate 11. Note FIGS. 1, 2 and 3. This plate, for example, can be fixed to the inner surface of the door of a vending machine, this door being outlined by dot-dash lines at 12 in FIG. 3 of the drawing simply to illustrate that, in attachment of the unit to the door, the door 12 will be apertured, as seen at 12' FIG. 3, to register with an elongated aperture 13 formed in the plate 11. This aperture is best shown in FIG. 1.

In addition to the plate 11, the unit includes an elongated casing 14, FIG. 1, and shown, in part, in section in FIG. 2. Flanged ends of this casing are spot welded to the plate 11, as diagrammatically seen at 15 in FIG. 1. Another irregular contoured casing 16, FIG. 1, and diagrammatically outlined in dot-dash lines in FIG. 3 is employed and similarly fixed to the plate 11 by spot welding, shown, in part, at 17 in FIG. 1. Various other supports will be employed for the several parts of the unit, but these will be dealt with later in the description.

Considering FIG. 2 of the drawing, a driven shaft 18 is shown supported in bearings 19 and 20 mounted in the plate 11 and the casing 14, repsectively. This driven shaft, between its bearing supports, is fashioned to form an elongated drive gear 21, to which are suitably keyed two clutch members 22 and 23 supporting two tooth-like clutch faces 22', 23'. 23' is shown in section in said figure.

Similar cooperating clutch faces 24 and 25 are secured to surfaces of two drive or feed wheels 26 and 27, which are freely rotatable on the drive gear portion 21 of the shaft 18. In FIG. 2 of the drawing, both clutches are shown in open position.

Arranged between the wheels 26 and 27 is a drive rack 28, having suitable channelled backings and guides 29 and 30, note FIG. 1, the backing 30 being best shown in section in FIG. 3 of the drawing. These backings are suitably supported on the plate 11. For example, the support for the backing 30 is illustrated at 31 in FIG. 3 of the drawing. The backing 29 includes a support for an adjustable stop screw 32, as diagrammatically seen in FIG. 1 of the drawing. The drive rack 28 is pivoted to the plunger 33 of a "Main Drive Solenoid" 34 supported on the plate 11, as diagrammatically seen at 35, the pivot of the rack being seen at 36 in FIG. 1 of the drawing. The plunger includes laterally extending arms 33', which check movement of the plunger in one direction in striking the face of the solenoid 34, which operation controls feed of the plastic tube 37 from one of the storage containers 38, shown at the top of FIG. 1. As both containers shown in FIG. 1 are generally of the same construction, like references will be primed on both parts to simplify the description. In other words, the lower container is identified by the reference character 38'. In the same respect, the tube from container 38' is indicated in dot-dash lines at 37' in FIGS. 2 and 3 of the drawing. In this connection, it will be understood that the tube 37' is fed by the wheel 27. Considering FIG. 1 of the drawing, it will appear that a spring 39 is coupled with the lower end of the rack 28 and fixed to the plate 11, as seen at 40, for normal support of the rack in position shown in FIG. 1.

Considering FIG. 2 of the drawing, I have shown, in part, at 41, what is referred to in FIG. 7 as a "Clutch Solenoid A" and at 42 is shown a "Clutch Solenoid B." Each of these solenoids have plungers 41', 42', generally similar to the plunger 33, and to which are pivoted links 43, 44, as seen at 45 and 46. Pivoted to the free ends of the links are clutch actuating levers 47 and 48 pivoted to suitable supports, as seen at 49 and 50, these levers operating the clutches 22, 23, respectively, as will be apparent, in controlling movement of the wheels 26 and 27 into operative or feed positions. At this time, it is pointed out that that the clutches are supported in the open position, shown in FIG. 2, by springs 51 arranged between 22', 24 and 23', 25 and one only of these springs is shown in order to simplify the illustration, but both clutch mechanisms will be of the same construction.

At this time, it may be well to point out that, in the use of the apparatus, the plastic tube 37 from the container 38 will be fed in operation of the apparatus cutting and delivering tubular straws, as later described, until the tubing stored on the spool 52 of the container 38 has been consumed; whereupon, the tubing from the container 38' will automatically take over in the cutting and delivery of straws. Then, as and when the apparatus is timely checked, a new container will be substituted for the container 38 in maintaining a constant supply of tubing for delivery in the apparatus.

Turning now to the feed and cutting of the tubing to form the projected tubular straw, attention is directed to FIGS. 1 and 3. At this time, it is pointed out that the guidance delivery and treatment of the straw to the cutting and delivery station will be dealt with later.

Mounted on suitable supports 53 fixed to the plate 11 are straw guide tubes 54, 54' having flared admission ends 55, 55', as best noted in FIG. 3. These tubes are curved from the cutter station, defined by the cutter blade 56, in the direction of the aperture 13, so that the cut straws 57, 57' will be delivered and projected through the aperture 13, as well as the aperture 12', note FIG. 3, to facilitate grasping by the person requireing the straw.

Near the delivery end of the straws is supported a generally U-shaped bracket 58 welded or otherwise fixed to the plate 11. This bracket supports a pivot pin 59, note FIGS. 5 and 6, on which a switch operating gate 60 is pivotally mounted, this gate having a protruding finger 61 shown, in section, in FIG. 5, which actuates the roller 62 of a micro switch 63, defined in FIG. 7 as the "Straw Discharge" switch. Normally, the gate 60 is in the position shown in FIG. 1 of the drawing but, as a straw is delivered, as seen in FIG. 3 of the drawing and the knife or cutter 56 is in its raised operative position, the micro switch 63 will be actuated, in the manner illustrated in FIG. 6 of the drawing, by raising the gate 60 as the straw 57 is delivered.

The cutter 56 is mounted on a lever 64, preferably of the irregular contour noted in FIG. 3 of the drawing to compensate for the curvature of the tubes 54, 54'. The lever is pivoted on a pin 65 fixed to the plate 11, as seen at 66, the lever having a long sleeve portion 67 arranged on the pin. The upper surface of the lever 64, adjacent its pivot, has a protruding rounded switch operating element 68. The free end portion of the lever 64 is forked and the forks of the lever have elongated apertures 69 operatively engaging a pin 70 welded or otherwise fixed to the drive rack 28, as best seen in FIG. 1 of the drawing, so that, in upward feed of the rack, the lever 64 is moved into raised position and the cutter 56 severs the projected tube 37, 37' in forming the resulting straw lengths 57, 57'. The lever 64 is shown in its raised position in FIG. 3 of the drawing where the tube has been severed in forming the straw. Another associated cutter blade 71 is mounted on the frame 16, as seen in FIG. 1 of the drawing, the blade 71 having a suitable support, as at 72.

Also mounted on 16 is another "End Of Stroke Micro Switch" 73, the roller 74 of which is actuated by the element 68 of the lever 64 as said lever moves into the raised position shown in FIG. 3 of the drawing. The same action takes place as and when the straw 57' is delivered. 73 is illustrated in FIG. 7 of the drawing. The operation here will be best understood from consideration of the later description of the circuit.

Considering FIG. 1 of the drawing, at 75 and 75' I have shown two backup wheels yieldably urging the tubes 37, 37' into engagement with the wheels 26, 27.

As both backup wheels and their means of operation are of the same construction, the brief description of one will apply to the other. At 76, 76' are shown, in FIG. 3 of the drawing, the forked ends of two pivoted levers, in which the wheels 75, 75' are rotatably mounted. In the illustration of FIG. 1, the lever 77' of the forked end 76' only is shown. The other lever would be directly in back of the one illustrated. The pivot of the lever 77' is shown at 78' in the casing 14. The free end of the lever 77' has a socket 79', in which is fixed, as at 80', one end of a spring, diagrammatically shown at 81', the other end of the spring being fixed at 82'. The spring 81' serves to urge the wheel 75' in the direction of the wheel 27 and the same will take place with the associated lever having the forked end 76, as noted in FIG. 3 of the drawing.

Mounted on the plate 11 are suitable supports 83, 83' for two tube guide casings or sleeves 84, 84'. These casings, adjacent their lower ends, have other supports in the form of electric heaters 85, 85', which are identified in FIG. 7 as "Heater A," "Heater B," respectively. These heaters are supported on the plate 11, as seen at 86, 86'. The sleeves 84, 84' serve to guide the tubing into close proximity to the cooperating wheels 26, 75; 27, 75', as diagrammatically illustrated at 84" in FIG. 1 of the drawing. The two heaters 85, 85', as well as the two sleeves or casings 84, 84', are diagrammatically illustrated in FIG. 2 of the drawing. This latter showing is made simply to illustrate that the lower ends of the heaters 85, 85' are in alinement with the wheels 26, 27; whereas, the nozzles 87, 87' at the upper ends of the sleeves or casings 84, 84' are in common vertical alinement in order to register with openings 88 in the containers 38, 38', these openings being shown in FIGS. 4, 8 and 9 of the drawing. Each of the nozzles have, at one side thereof, tube admitting openings 89, 89' adapted to receive protruding ends 90, 90' of the stored tubing 37, 37'. Part of the stored tubing on the spool 52 of the container 38 is diagrammatically illustrated in FIG. 1 of the drawing.

It will be noted from a consideration of FIGS. 1 and 3 of the drawing that the inner adjacent portions of the forked ends of the levers 76, 76' are flattened, as seen at 76", to clear the free forked end portion of the lever 64.

As previously stated, both containers 38, 38' are of the same construction. However, in FIGS. 8 and 9, the detailed structure of the container 38 is shown by way of illustration. The container consists of a main casing part 91 of sufficient depth to receive the spool 52, as clearly illustrated in FIG. 8. On the casing 91 is mounted a cover 92 which forms one side wall of the resulting container 38. The side wall of the casing is shown at 93 and the side wall of the cover is shown at 93' in FIG. 8 of the drawing. Both of these walls are die cut, as diagrammatically illustrated in dotted lines at 94 in FIG. 1 of the drawing, to form circumferentially spaced hub members 95, 95'. These hub members are bent inwardly and are preferably retained in the inwardly bent position by suitable ring members 96, 96', as shown in FIG. 8 only of the drawing, to maintain the same in proper supporting position and these hub members form axial supports, upon which the core 97 of the spool 52 is free to rotate under slight friction, this friction being sufficient to prevent free unravelling of the tubular stock 37 arranged on the spool. The core 97 is provided intermediate the hub members 95, 95' with circumferentially spaced finger apertures 98 facilitating manual operation of the spool, particularly in initially delivering the tubing to a position engaging the cutter 56, when the latter is in the raised position, as shown in FIG. 3 of the drawing. After this manual operation, the withdrawal of the tubing 37, 37' from the spools will be automatic and consistent with the feed delivery of the drive wheel which is in operation at the time.

While, initially, both of the tubes 37, 37' will be delivered to a point abutting the blade 56 when in the raised position shown in FIG. 3, it will be understood that, when the tube 37 only is delivered, the clutch 22 will have its clutch face 22' in operative engagement with the clutch 24. Thus, the wheel 26 only is driven and the wheel in this operation remains at rest, as the shaft 18 rotates freely within this wheel. Now it will be understood that, as and when the end of the tube 37 passes the roller 99 of a micro switch 100, the roller 99, which normally bears upon the tube 37, in passing through an aperture 101 in 84, as clearly seen in FIG. 1A, will move into the dotted line position of said figure, actuating the switch 100. A similar control switch 100', including a roller 99', are employed to control consumption of the tube 37' on the spool of the container 38', as will appear from a consideration of FIG. 1 of the drawing.

The switches 100, 100' actuate the circuit, as later described in detail. However, at this time, it will be pointed out that, in the operation of the apparatus, the formation and delivery of the straws 57, 57' is an intermittent operation controlled by the manual operation of a push button, later described, which puts the electric circuit into operation for actuating the clutches and the rack drive, sometimes referred to as the driver. Thus, it will be apparent that, on the completion of a cycle of operation, the engaged clutch is moved into inoperative position and the next operation of said push button will again move the clutch into operative position in delivery of the next successive straw. It is here also well to point out that, in operation of a vending machine, the customer may not require a straw and, thus, will not operate the button controlling the straw discharge. Therefore, in this vending cycle, the straw vending apparatus will remain at rest.

Considering FIGS. 4, 8 and 9 of the drawing, it will appear that the container 38 has a closure tape 102 of any suitable material capable of being removed as and when required. This tape normally closes the aperture 88, as will appear from a consideration of FIGS. 8 and 9 of the drawing. Fixed to this tape for registration with the aperture 88 is a dowel pin 103, which frictionally engages the bore 104 of the tube 37, as best seen in FIG. 9, and supports the tube end in the position shown in said figure in the shipment and transportation of the container. The pin 103 has a thin large diameter head 105 so that, in removal of the end of the tape from the container, the pin 103 will draw the end of the tube 37 outwardly through the aperture 88, as indicated in dotted lines in FIGS. 4 and 9. Then, it is possible for this protruding end 90 to be placed in the aperture 89 of the nozzle 87, as best seen in FIG. 4 of the drawing. At this time, the spool 52 is rotated by hand in feeding the tube 37 downwardly through the sleeve or casing 84. It will be understood that the tape 102 can be entirely removed. On the other hand, if the containers are re-used, the tape can be again placed in operative position as and when the container has been refilled.

Considering FIG. 1 of the drawing, it will appear that the plate 11 has a plurality of container supports fixed thereto such, for example, as the side supports 106, plus top and bottom supports for 38, 38', as at 107 and an intermediate spacing support 108. Pivoted to the top and bottom supports 107 are retainer catch devices 109 and a dual device 110 is mounted in connection with 108 and these catch devices retain the two containers 38, 38' in proper alined positions in the assembled unit. At the same time, they permit removal of containers and substitution of new containers.

Again, considering FIG. 1 of the drawing, at 111 is diagrammatically shown a manually operated push button for controlling discharge of the straws 57, 57' and, in FIG. 7 of the drawing, the "Start Button" switch is shown at 111. At 112 I have also shown a manually operated switch, which is identified in FIG. 7 as "Selector" switch, to which the reference numeral 112 is applied. This switch controls operation, particularly after a new container has been substituted for the container 38. In other words, in the position of the switch, as shown in FIGS. 1 and 7, the automatic transfer from 38 to 38' will be cared for but, in moving this switch into the dotted line position shown in FIG. 7 or, in other words, down instead of up, as shown in FIG. 1, as and when the tubing is being consumed from the container 38', there will be an automatic transfer of feed of the new tubing in the container which has been substituted for the container 38.

The gate 60 can have a spring hinge mounting on the pin 59 or suitable spring means can be employed to maintain 60 normally in the position shown in FIG. 1. As such means are commonly known in the art, no attempt has been made to illustrate the same.

In FIG. 7 of the drawing, the circuit is diagrammatically illustrated. For example, 13 and 14 show the lines coming from a suitable 110 v. A.C. current supply. In the circuit is what I have termed a "Vender" switch 115 actuated when the vending machine is put into operation. This switch controls the circuit to a "Latching Relay" 116.

In initial start of the apparatus with both containers filled with tube and parts generally in the position shown in FIG. 1 of the drawing, the closing of the "Vender" switch 115, which takes place momentarily upon the insertion of a coin to vend a predetermined product, completes the circuit to the "Latching Relay" 116, which automatitcally closes switches 117, 117', which completes the circuit to the line 114. At this time, the "Start Button" 111 will be open, the straw discharge switch 63 will be closed and the end of stroke switch 73 will be closed.

It will, thus, be seen that, upon closing the "Start Button" switch 111 for delivery of a straw, the circuit now will be completed to a "Latching Relay" 118, a "Time Delay Relay" 119, a "Holding Relay" 120 and to the main drive solenoid 34, to the circuitry controlled by the "Selector" switch 112, to the two "Clutch Solenoids" 41, 42 and, in the full line showing, the switches 100, 100' in FIG. 7, the circuit will be completed to the clutch solenoid 41.

The "Holding Relay" coil 120 closes a switch 121 which bypasses switches 111 and 63 which maintains current flow to the circuit heretofore mentioned. The "Latching Relay" 118 will now open switches 117, 117'. The "Time Delay" coil 119 will close previously open "Time Delay" switch 122, which therefore takes the place of 117 to maintain current flow. This "Time Delay" coil 119 also closes switch 123 in a circuit 124 extending to "Heaters A" and "B," identified by the reference characters 85, 85'.

The actuation of "Clutch Solenoid" 41 puts the wheel 26 into operation for delivery of the tube 37 into the position of the straw 57, shown in FIG. 3, it being understood that the cutter operating lever 64 has been in operation to sever the projected tube, as seen in FIG. 3 of the drawing. In this latter operation or, in other words, movement of the lever 64 into its raised position, the switch operating element or knob 68 has actuated the switch 73 to move this switch into open position, as indicated in dotted lines in FIG. 7 of the drawing, thus breaking the circuit to the several solenoids and the "Latching Relay" 118. Keeping in mind that switches 122 and 123 are closed, the circuit to the heaters 85, 85' is maintained.

In the foregoing description, it will be understood that the switch 63 is in a closed circuit position, until such time as a straw, such as 57, is delivered from the machine, as illustrated in FIG. 3 of the drawing, as well as in FIG. 6. However, upon removal of the delivered straw by the operator of the machine, the switch 63 will automatically be returned into its closed position by spring actuation of the gate 60, as shown in FIG. 1. In other words, the gate 60 will be moved from the position shown in FIG. 6 to the position shown in FIG. 1.

The switch 117' will control start button operation for the delivery of one straw only at a time, it being understood that switches 117, 117' automatically open as and when the "Latching Relay" 118 and switch 121 are in operation.

The "Time Delay" switch 122 is set for a predetermined period of operation, starting from the moment that the "Time Delay" coil 119 is actuated. For illustrative purposes, this could be set for three to five minutes to be certain that the switch 122 will be moved into inoperative position, in the event of any faulty operation of the apparatus and preventing, in this connection, for example, burning out of the solenoids 34, 41, 42 and overheating of the heaters 85, 85'.

Considering FIG. 7 of the drawing, the selector switch circuit comprises a wire 125 extending to switch 100, the switch 100 controlling a circuit 126 extending to solenoid 41, as seen, as well as extending to a wire 127 extending to the solenoid 42. At 128 is another circuit wire engaged by the switch 112 which, when the switch 100' is in the dotted line position shown in FIG. 7, extends directly to the solenoid 41. However, in the full line position of the switch 100' in FIG. 7, the switch is in direct circuit with 127 through a branch 129. Thus, it will be seen that, in the full line position of switches 112, 100 and 100', the circuit is completed only to the solenoid 41. This position will be maintained as long as there is a tube 37 delivered from the container 38 or, in other words, holding the roller 99 of switch 100 in the full line position of FIG. 1A. However, when the tube 37 is consumed and roller 99 moves into the dotted line position of FIG. 1A, the switch 100 will move into the dotted line position of FIG. 7, closing the circuit directly to the solenoid 42 and breaking the circuit to the solenoid 41.

Now, when the apparatus is serviced, the operator will note that the tube 37, 38 has been consumed. He will then move selector switch 112 into the dotted line position of FIG. 7 now completing the circuit to clutch 42 through the wire 128, the switch 100', the branch 129 to the wire 127 continuing to hold clutch 42 in operative position. Now the old container 38 can be removed and a new container substituted, in the manner previously described and, in feeding the tube of the new container into operative position, in other words, into abutting engagement with the cutter 56 which can be manually moved into raised position in this operation, the switch 100 will have been actuated to return this switch to the full line position of FIG. 7. With 112 in the dotted line position, the circuit will be broken to the clutch 41.

Now, when the tube 37' of the container 38' is consumed in the manner referred to above with respect to the tube 37, the switch 100' will be actuated to move the same from the full line position of FIG. 7 into dotted line position, thus completing the circuit directly to the clutch 41, putting the new supply of the substituted container 38 into operation and breaking the circuit to the clutch 42.

Again, it will be apparent that, when the serviceman replaces a new container 38', he will again first operate the switch 112 to return it to the full line position of FIG. 7 and, in putting the substituted tube 37' into operative position in the manner previously described, the switch 100' will be actuated to return the same to the full line position of FIG. 1, thus returning the circuit to the position as illustrated in FIG. 7 and the foregoing operations can be repeated as often as substitution of containers 38, 38' is made.

Having fully described my invention, what I claim as new and desire to secure by Letters Patent is:

1. An apparatus of the character defined having means for support of two supply and storage spools of plastic tubes, means for guiding plastic tubes from said spools to a delivery and cutting station, said station having two normally free driving wheels for delivery of tubes, one at a time, in predetermined straw lengths, a driver for actuating the driven wheel, means in operative engagement with said driver for simultaneously actuating a cutter in severing said tube to form said straw length delivered from the apparatus, means for actuating said driver, a solenoid actuated clutch movable into and out of engagement with each of the wheels, one wheel only being driven in each cycle of operation of the apparatus, means returning the driver to normal inoperative position upon completion of the drive of the driven wheel, and means comprising switches operatively engaging each of the tubes delivered from the spool storage for automatically putting a second drive wheel into operative engagement with the tube of a second supply spool upon consumption of the tube from the initial supply spool.

2. An apparatus as defined in claim 1, wherein said fourth named means comprises a solenoid, and means closing a circuit to said solenoid at the end of the feed stroke of said driver.

3. An apparatus as defined in claim 2, wherein said third named means comprises a lever actuated by the driver, and said last named means comprising an element on said lever operatively engaging a micro switch in circuit with said last named solenoid.

4. An apparatus as defined in claim 1, wherein the clutches controlling operative engagement of the drive wheels are independently actuated by levers in operative engagement with said first named solenoids and in circuit with said last named means.

5. An apparatus as defined in claim 1, wherein said second named means comprises elongated sleeves extending from the first named means to a position adjacent said wheels, and said sleeves having heaters for heating the plastic tubes one at a time prior to moving the tubes to the delivery and cutting station.

6. An apparatus as defined in claim 4, wherein means is employed for guiding cut straws in delivery thereof to predetermined position in the apparatus.

7. An apparatus as defined in claim 4, wherein said delivered straws actuate a switch breaking a circuit controlling operation of said driver.

8. An apparatus as defined in claim 1, wherein said wheels and clutches are mounted on a shaft having a gear portion, to which said clutches are keyed, said wheels having clutch faces engaged by said clutches, and springs normally supporting said clutches in spaced inoperative relationship with respect to said wheels.

9. An apparatus as defined in claim 1, wherein said cutter checks initial feed of said tubes to the delivery and cutting station.

10. An apparatus as defined in claim 1, wherein said supply and storage spools are each arranged and sealed in a container, each container having hub members on which the spools are rotatable, and the spools being accessible between the members of each container for manual rotation of said spools within said containers.

11. An apparatus as defined in claim 10, wherein each container has an opening for discharge of stored tube, said second named means including a nozzle registering with said opening, and said nozzle being fashioned to receive a part of said tube when projected through the opening in said container.

12. In apparatus for dispensing plastic straws, a tube supply and storage container, a spool rotatable in said container, an elongated plastic tube wound on said spool, the container having an opening for discharge of said tube, said tube having a free end arranged adjacent said opening, means on the container for sealing said opening, and removal of said last named means permitting passage of said tube free end through said opening.

13. A container as defined in claim 12, wherein said sealing means includes means for support of said tube end in alinement with said opening.

14. A container as defined in claim 13, wherein said last named means comprises a pin fixed to said sealing means and frictionally engaging said tube end.

15. A container as defined in claim 12, wherein said container comprises two parts, said parts having generally similar side walls, said side walls having hub members on which said spool is rotatable, and said spool being accessible through said sides of the container for manual rotation of the spool on the hub members in initial discharge feed of the tube from said container.

16. In an apparatus for feeding elongated plastic tubes from two storage spools and cutting said tubes one at a time to form straws of predetermined length and wherein said apparatus includes a solenoid operated rack driver, a knife actuating lever in operative engagement with said driver, a feed wheel operatively engaging each tube, yieldable means supporting the tubes in engagement with said feed wheels and solenoid operated clutches controlling independent drives of said wheels, a circuit controlling operation of said apparatus, said circuit comprising a starter button momentarily closing circuits to said solenoids through a latching relay, a manually actuated selector switch controlling circuits to said clutch solenoid, switches in said last named circuits controlled by the plastic tubes extending from said storage spools, maintaining at least one of said clutch solenoids in operation at all times, a switch actuated by said knife actuating lever for breaking the circuit to all of said solenoids, the switches controlling operation of the clutch solenoid automatically compensating for maintaining delivery of straws from one of said storage spools, and said latching relay controlling release of one straw at a time.

17. A circuit as defined in claim 16, wherein said circuit includes a switch actuated by the delivered straw for breaking the circuit to said starter button.

18. A circuit as defined in claim 17, wherein the circuit includes a time delay switch controlling said last named switch and starter button.

19. A circuit as defined in claim 16, wherein said circuit includes electric heaters for heating the tubes prior to formation of straws therefrom.

20. A circuit as defined in claim 16, wherein a holding relay is employed for maintaining the circuits to all of said solenoids.

No references cited.

WILLIAM W. DYER, Jr., *Primary Examiner.*

J. M. MEISTER, *Assistant Examiner.*